Patented May 30, 1944

2,350,199

UNITED STATES PATENT OFFICE 2,350,199

VINYL RESIN

Ronald W. Staley, Pittsfield, Mass., assignor to General Electric Company, a corporation of New York No Drawing. Original application March 21, 1942, Serial No. 435,636. Divided and this application October 1, 1943, Serial No. 504,605

3 Claims. (Cl. 260—23)

This application is a division of my copending application Serial No. 435,636, filed March 21, 1942, now Patent 2,340,151, dated January 25, 1944, and assigned to the same assignee as the present invention.

The present invention relates to vinyl resins and more particularly to vinyl resins stabilized against the action of heat and light.

Broadly, my invention relates to the heat and light stabilization of resinous compositions produced by polymerizing compositions comprising a vinyl halide with or without other copolymerizable compounds. Among such compositions are: (1) the polyvinyl halides, such as for example polyvinyl chloride, polyvinyl bromide; (2) vinyl resins produced by the conjoint polymerization of vinyl halides and vinyl esters of the lower aliphatic acids, such as the copolymers of vinyl chloride with, for example, vinyl acetate, vinyl propionate, vinyl butyrate, vinyl chloracetate, vinyl chlorpropionate; (3) vinyl resins produced by the conjoint polymerization of vinyl halides and an acrylic compound, such as the copolymers of vinyl chloride with, for example, ethyl methacrylate, methyl methacrylate, methyl acrylate, methyl ethacrylate, benzyl acrylate, chlorbenzyl acrylate, methyl chloracrylate; and (4) many other vinyl resin copolymers, such as the copolymers of three component systems, for example, vinyl chloride, vinyl acetate and ethyl methacrylate, etc. As will be understood by those skilled in the art, other multi-component copolymers may be used, the only requirement being that at least one of the components is a vinyl halide.

I have found that the class of compounds represented by the general formula:

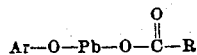

where R is an aliphatic radical containing at least 9 carbon atoms and Ar is an aryl radical, are excellent heat and light stabilizers for vinyl halide resins. Illustrative examples of fatty acid radicals represented by

are: undecylic, lauric, myristic, palmitic, oleic, linoleic, ricinoleic, stearic, nondecylic, etc. Illustrative examples of aryl radicals represented by Ar include: phenyl, tolyl, xylyl, naphthyl, chlorophenyl, chlorotolyl, etc. Where the radical has a substitute grouping the various isomers are included.

In the following examples, which are given by way of illustration but not by way of limitation, Example 1 shows the preparation of a typical stabilizer of my invention. The vinylite resin employed in the examples is a copolymer of vinyl chloride and vinyl acetate, the vinyl chloride being of the order of 85%. All parts are by weight.

Example 1

| | Parts |
|---|---|
| Phenyl stearate | 30.85 |
| Lead oxide (litharge) | 19.15 |

The above reactants are heated together at 140–150° C. for 3½ hours by which time all of the lead oxide is dissolved and a clear melt is obtained. Stirring is maintained throughout the heating period. Although this product, lead phenoxy stearate, may be used as obtained above, a purer product may be obtained by crystallizing the reaction product from benzene or toluene. The purified product is a white waxy crystalline solid.

Example 2

| | Parts |
|---|---|
| Vinylite resin | 99.5 |
| Phenoxy lead stearate | 0.5 |

The above components are milled for 3 minutes on differential rolls, the front roll of which is heated with steam under a pressure of 20 to 30 pounds per square inch. The compound after grinding is then molded for 5 minutes at a temperature of 175° C. under a pressure of 2,000 pounds per square inch. Although these molding conditions are more severe than those utilized normally in molding this type of resin the resin darkens only slightly with little adherence to the mold. However, when the vinylite resin containing no stabilizer is sheeted and molded as described above, the molded piece is considerably darker and in addition adheres to the mold to a very much greater extent than the above sample containing the stabilizer. In fact, cutting the molding time to 1 minute for the unstabilized vinylite resin, which more nearly approaches normal molding conditions, does not prevent the discoloration from being greater than that for the stabilized resin under the more severe molding conditions described above. For practical purposes, it can be said that 0.5% is the minimum amount of stabilizer that should be used.

Example 3

| | Parts |
|---|---|
| Vinylite resin | 99 |
| Penoxy lead stearate | 1 | were sheeted and molded in the same way as described in Example 2. The piece did not darken or adhere to the mold proving that it was stabilized towards this severe heat treatment.

*Example 4*

| | Parts |
|---|---|
| Vinylite resin | 98 |
| Phenoxy lead stearate | 2 | were treated as described under Example 2. Again a well stabilized molded piece was obtained. More severe heat treatment causes a faint opalescence but no discoloration to appear. When 1% titanium dioxide was included in the formulation and the molded piece subjected to a carbon arc for 17 hours, no discoloration could be detected showing that the piece was stabilized against actinic radiation.

Excellent heat stabilized compositions were also obtained with the following compositions when treated and tested according to the conditions of Example 2.

*Example 5*

| | Parts |
|---|---|
| Polyvinyl chloride | 83 |
| Plasticizer (methyl pentachlorostearate) | 15 |
| Phenoxy lead stearate | 2 |

*Example 6*

| | Parts |
|---|---|
| Polyvinyl chloride | 82 |
| Plasticizer (#1488 Pyranol—a chlorinated diphenyl composition) | 15 |
| Phenoxy lead stearate | 3 |

*Example 7*

| | Parts |
|---|---|
| Copolymer of vinyl chloride (98%) and chlorobenzyl acrylate (2%) | 98 |
| Phenoxy lead stearate | 2 |

It is apparent from the examples illustrating the invention that small amounts of the phenoxy lead stearate exert a stabilizing effect on the vinyl resins. Thus, provided the stabilizer is present in a quantity of at least 0.5% stabilization is effected. Amounts in excess of 5% may be used. However, for economical reasons I prefer not to use larger amounts.

It will be understood, of course, by those skilled in the art that my invention is not limited to the stabilization of polymers or copolymers of a vinyl halide with phenoxy lead stearate. Instead of using phenoxy lead stearate I may use other aryloxy lead salts of monocarboxylic aliphatic acids having more than ten carbon atoms in the acid radical, examples of which are:

Phenoxy lead undecylate
Phenoxy lead laurate
Toloxy lead myristate (cresyl lead myristate)
Toloxy lead stearate
Toloxy lead oleate
Phenoxy lead oleate
Phenoxy lead ricinoleate
Xyloxy lead stearate
Xyloxy lead palmitate
Chlorophenoxy lead undecylate
Chlorotoloxy lead oleate
Naphthoxy lead palmitate
Naphthoxy lead linoleate
Xyloxy lead montanate
Toloxy lead hypogeate
Phenoxy lead carnaubate The above compounds may readily be prepared by the method disclosed in Example 1 by using the corresponding tolyl, xylyl or naphthyl esters of the appropriate aliphatic monocarboxylic acid in place of the phenyl stearate.

In the compounding of plastic compositions for various uses, there may be included any of the common solvents, plasticizers, pigments, and other modifying materials without detrimental effect upon the heat and light stability afforded by these new stabilizers.

Various means well known to the art may be used for incorporating the stabilizers of this invention into the resinous compositions. For example, the resin and plasticizer may be dissolved in a mutual solvent and intimately mixed followed by the evaporation of the solvent if the composition is not to be used as a varnish. Sheeting on differential rolls, as was used in the examples, may also be used. It is important to obtain as intimate and complete dispersion or solution of the stabilizer in the resin as is possible.

The stabilizers used in the present invention are to be distinguished from the organo metallic salts such as, for example, diphenyl lead stearate, tributyl lead oleate, etc., in which the lead is joined directly to the carbon atom of the organo group and which generally are extremely poisonous and difficult and somewhat dangerous to handle. In marked contrast, the aryloxy lead salts of this invention are no more poisonous than the litharge and phenol from which they are made. The lead is joined to the aryl radical through an oxygen atom which, according to many tests which I have conducted, apparently gives the compounds increased solubility in the vinyl halide polymers and copolymers. In fact, these new stabilizers have a greater solubility in vinyl resins than any stabilizer that I have tested. This is extremely important when it is desired to stabilize a clear, unfilled resin.

The aryloxy lead salts also differ from the lead phenates which are the lead salts of phenols and which are easily hydrolyzable and of very limited solubility in vinyl halide resins.

The stabilized vinyl halide polymers and copolymers of this invention may be used not only for compression and injection molding compounds but also for the preparation of varnishes, adhesives, castings, laminated products, etc.

Although in the above examples I have shown copolymers of a vinyl halide containing in the order of 85% to 98% vinyl halide, I may use other copolymers in which the vinyl halide is present in lower concentrations, for example 50%. However, for maximum strength and flame resisting properties I prefer that the polyvinyl halide be present in the copolymers in an amount equal to at least 60%.

What I claim as new and desire to secure by Letters Patent of the United States is:

1. A composition comprising (1) the product of conjoint polymerization of a mixture comprising vinyl chloride and an acrylic ester, and (2) a heat and light stabilizer comprising a compound having the general formula:

wherein Ar is an aryl radical and R is an aliphatic radical having at least 9 carbon atoms.

2. A composition as in claim 1 wherein the acrylic ester is chlorobenzyl acrylate.

3. A composition comprising (1) a copolymer obtained by conjoint polymerization of a mixture comprising vinyl chloride and chlorobenzyl acrylate, and (2) phenoxy lead stearate.

RONALD W. STALEY.